(12) United States Patent
Tsui et al.

(10) Patent No.: US 8,275,028 B2
(45) Date of Patent: Sep. 25, 2012

(54) ADVANCED TELEVISION SYSTEMS COMMITTEE (ATSC) DIGITAL TELEVISION (DTV) RECEIVER

(75) Inventors: Ernest Tsui, Cupertino, CA (US); Siva Simanapalli, Santa Clara, CA (US); Lei Shao, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 735 days.

(21) Appl. No.: 12/495,594

(22) Filed: Jun. 30, 2009

(65) Prior Publication Data

US 2010/0329309 A1 Dec. 30, 2010

(51) Int. Cl.
*H03H 7/40* (2006.01)
(52) U.S. Cl. ......... 375/233; 375/232; 375/350; 708/323
(58) Field of Classification Search .................. 375/229, 375/230, 232, 233, 350; 708/300, 319, 322, 708/323
See application file for complete search history.

(56) References Cited

U.S. PATENT DOCUMENTS

| | | | |
|---|---|---|---|
| 5,561,687 A * | 10/1996 | Turner | 375/233 |
| 6,697,423 B1 * | 2/2004 | Jin et al. | 375/233 |
| 7,006,564 B2 * | 2/2006 | Ling et al. | 375/232 |
| 7,257,181 B2 * | 8/2007 | Jones et al. | 375/350 |
| 2004/0100587 A1 | 5/2004 | Kim | |
| 2007/0058081 A1 | 3/2007 | Kim et al. | |

FOREIGN PATENT DOCUMENTS

WO WO-2011/002940 1/2011

OTHER PUBLICATIONS

International Preliminary Report on Patentability received for International Patent Application No. PCT/US2010/040680 mailed on Jan. 12, 2012; 6 pages.
International Search Report and Written Opinion for International Patent Application No. PCT/US2010/040680, Mailed Jan. 20, 2011, 8 pages.

* cited by examiner

*Primary Examiner* — Dac Ha
(74) *Attorney, Agent, or Firm* — Sutherland Asbill & Brennan LLP

(57) ABSTRACT

A computer system may comprise a receiver to perform equalization. The receiver comprises an equalizer. The equalizer may determine locations of a principal tap, a platform noise tap, and a pre-cursor tap in a feedforward path of an equalizer. Also, the equalizer may determine locations of a post-cursor tap, a cross-term tap, and a portable tap in a feedback path of the equalizer. The receiver may align the portable tap in the feedback path with the principal tap in the feedforward path. The platform noise tap may cancel the effect of platform noise on a principal located at the principal tap, thus enabling the computer system to operate effectively in severe platform noise environment. Also, the computer system may operate in statics and portable environment in which platform noise and AGWN may be present.

30 Claims, 8 Drawing Sheets

US 8,275,028 B2

ADVANCED TELEVISION SYSTEMS COMMITTEE (ATSC) DIGITAL TELEVISION (DTV) RECEIVER

BACKGROUND

Wireless communication systems based on standards such as advanced television systems committee (ATSC), typically, comprise a transmitter and a receiver. The receiver is used to reproduce a signal as close as possible to a transmitted signal, which is transmitted over a channel which may add inter-symbol interference (ISI) and noise and distort the transmitted signal. The receiver comprises an equalizer, which may reverse or the inverse the effect of time-varying multipath channel and interference caused by the channel. Such ATSC DTV receivers may be used in computer systems.

In order to reduce the electromagnetic interference caused due to high clock frequencies in computer systems and peripherals, spread spectrum clock generation (SSCG) is used. SSCG may be, advantageously, used to modulate the clock signal to reduce the electromagnetic interference (EMI). However, the spread spectrum clocks cause interferences. The interference caused by harmonics of multiple spread clocks with base frequencies such as 40-80 MHz (LCD pixel clock), 33.33 MHz (PCI clock), 100 MHz (PCI-e) clock, data buses, and video signals may be referred to as platform noise (PFN).

Platform noise (PFN) is a major concern in portable environments such as laptop computer systems, netbooks, mobile internet devices, and personal digital assistants.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes embodiments of an ATSC DTV receiver. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
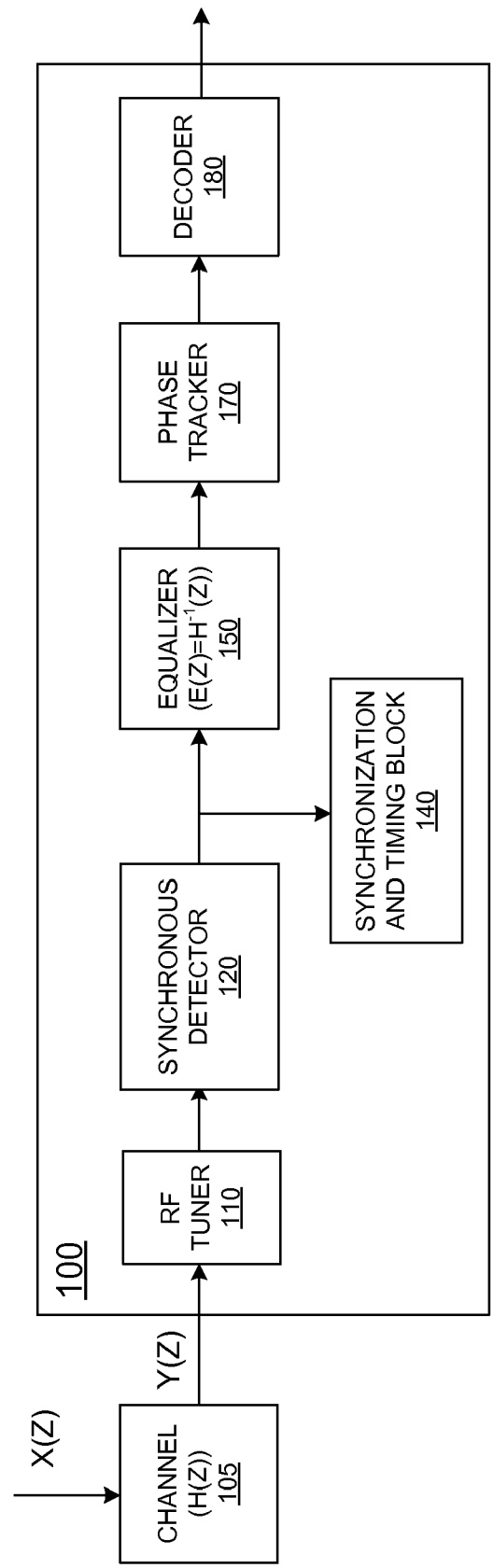
FIG. 1 illustrates a receiver 100, which includes a technique to reduce the effect of platform noise according to one embodiment.

An embodiment of a ATSC DTV receiver 100, which may support techniques to reduce the effect of platform noise is illustrated in FIG. 1. In one embodiment, the receiver 100 may comprise a radio frequency tuner 110, a synchronous detector 120, a synchronization and timing block 140, an equalizer 150, a phase tracker 170, and a decoder 180. In one embodiment, the receiver 100 may receive signals transmitted over a channel 105. In one embodiment, the channel 105 may represent a radio or air channel and the transmitted signal may be affected by the channel 105 due to noise and other interference. In one embodiment, the channel 105 may be modeled as a birth-death type channel.

In one embodiment, the radio frequency (RF) tuner 110 may receive signals of different frequencies transmitted over the channel 105. The RF tuner 110, which operates as the front end of the receiver 100 may receive 6 MHz signal of an ultra high frequency (UHF) or very high frequency (VHF) from the channel 105. In one embodiment, the digital signals may be scrambled and the scrambled digital signals may be descrambled using quadrature amplitude modulation (QAM) tuner. A phase-locked loop circuits may recover the carrier from a pilot tone within the 6 MHz signal and the synchronous detector 120 may be used for synchronous detection of a vestigial side-band (VSB) signal to generate a complex baseband signal.

In one embodiment, the synchronous detector 120 may receive a complex signal in 8-PAM (pulse amplitude modulation) format and may process the complex signal to generate in-phase (I) and quadrature (Q) components or data streams. In one embodiment, the in-phase (I) data stream and quadrature (Q) data stream may be provided to the equalizer 150. In one embodiment, a real valued 8-PAM signal x(t) may be converted to analytic signal $x_a(t)=x(t)+jx_h(t)$ in which the quadrature component is the Hilbert transform of the inphase component, and then the analytical signal may be spectrally shifted by $-f_s/4$, where $f_s$ is the VSB symbol rate.

The digital signals may comprise segment sync sequences, data field sync, and PN sequences such as PN 511. The synchronization and timing block 140 may use the segment sync sequences (pattern 1 −1 −1 1, at the beginning of every segment of 77.3 micro seconds) for timing synchronization to recover a properly phased 10.76 MHz symbol clock. The synchronization and timing block 140 may perform timing synchronization using correlation techniques.

In one embodiment, the equalizer 150 may suppress the multipaths/echoes and may compensate for various distortions. In one embodiment, the transfer function of the equalizer 150 may equal $H^{-1}(Z)$, the inverse of the transfer function $H(Z)$ of the channel 105. In one embodiment, the inverse transfer function of the equalizer 150 provides restoring or at least substantial restoration of the original signal transmitted by a transmitter. In one embodiment, the equalizer 150 may use techniques to cancel the effect of platform noise on the principal and to enable the equalizer to converge quickly in a statics and portable environment. In one embodiment, the equalizer 150 may improve the threshold of visibility (TOV) SIR from M to X db (for example, M may equal 13 db and X may equal 6 db), which may provide a gain of K db (=M−Xdb). In one embodiment, the equalizer 150 may further improve the TOV SIR to Y db by appropriately scaling the received data with a principal tap set at to amplitude of 1 unit. In one embodiment, the Y may equal −15 db and the equalizer 150 may provide a total gain of 21 db (difference from 6 db to −15 db).

In one embodiment, the equalizer 150 may perform channel estimation to accurately estimate the main path signal power without including the interference power. In one embodiment, the equalizer 150 may refine, normalize, and set a threshold value using the cross correlation result. In one embodiment, the peaks above the threshold value may represent paths such as a peak with maximum amplitude may represent a principal tap, a first peak occurring earlier (traveled a shorter path than the principal) to (i.e., to the left of) the principal may represent a pre-cursor (pre-echo), and a first peak occurring after a delay (traveled a longer path than the principal) (i.e., to the right of) the principal may represent a post-cursor (post-echo). In one embodiment, the equalizer 150 may determine the position of the principal, pre-cursor, post cursor, and cross term taps based on the channel estimation. In one embodiment, the equalizer 150 may determine the position of the platform noise (PFN) tap in the feedforward path to cancel the effect of the platform noise on the principal tap. In one embodiment, the equalizer 150 may determine the position of a portable tap in the feedback path to effectively decrease the effect of the delayed received copies caused by a time varying birth-death type of the channel 105.

In one embodiment, the equalizer 150 may determine the taps such as the precursor, postcursor, PFN tap, cross-term tap, portable tap, and principal. In one embodiment, the equalizer 150 may work as inverse of the channel 105. In one embodiment, if H(z) is the transfer function of the channel 105, then the equalizer 150 may perform inverse of the transfer function of the channel 105, which may be represented as shown in Equation (1) below $$E(z)=H^{-1}(z) => E(z)Y(z)=X(z) \qquad \text{Equation (1)}.$$

For a principal signal x(t), a precursor with amplitude β and time advance $\tau_\beta$ is $\beta x(t+\tau_\beta)$, and a postcursor with amplitude α and time delay $\tau_\alpha$ is $\alpha x(t-\tau_\alpha)$, so the received signal y(t) is given by Equation (2) below.

$$y(t)=\beta x(t+\lambda_\beta)+x(t)+\alpha x(t-\lambda_\alpha) => H(z)=(\beta z^{\lambda_\beta}+1+\alpha z^{-\lambda_\alpha}) \qquad \text{Equation (2)}$$

In one embodiment, E(Z) may be determined using the Equation (3) below $$E(z)=(\beta z^{\lambda_\beta}+1+\alpha z^{-\lambda_\alpha})^{-1}=1-(\beta z^{\lambda_\beta}+\alpha z^{-\lambda_\alpha})+(\beta z^{\lambda_\beta}+\alpha z^{-\lambda_\alpha})^2=1-(\beta z^{\lambda_\beta}+\alpha z^{-\lambda_\alpha})+2\alpha\beta z^{\lambda_\beta-\lambda_\alpha}+\beta^2 z^{2\lambda_\beta}+\alpha^2 z^{-2\lambda_\alpha} \qquad \text{Equation (3)}$$

wherein (β, $\lambda_\beta$) refer to the precursor and (α, $\lambda_\alpha$) the postcursor. From Equation (3), a principal tap (i.e., 1), a precursor tap (i.e., $\beta z^{\lambda_\beta}$), a postcursor tap (i.e. $\alpha z^{-\lambda_\alpha}$), a cross-term tap (i.e. $2\alpha \beta z^{\lambda_\beta-\lambda_\alpha}$) may be computed and the second and higher order taps may be ignored depending on the amplitudes α, β.

In one embodiment, the feedforward path of equalizer 150 may be used to deal with precursor and to deal with PFN. In order to deal with the PFN, an additional D number of taps may be added on the right side of principal in feedforward path. In one embodiment, the feedback path of the equalizer 150 may be used to deal with a post-cursor.

In one embodiment, the phase tracker 170 may suppress the high frequency noise in the signal received from the equalizer 150. In one embodiment, the high frequency noise components may be present in the signal generated by the equalizer 150 as the phase-lock loop circuits operate in the narrow bandwidth and may not be able to suppress the high frequency noise in the signal received over the channel 105. In one embodiment, the decoder 180 may protect the signal against impulse noise and other interferences. In one embodiment, the decoder 180 may comprise Trellis and Reed-Solomon (RS) decoders.

Figure 2:
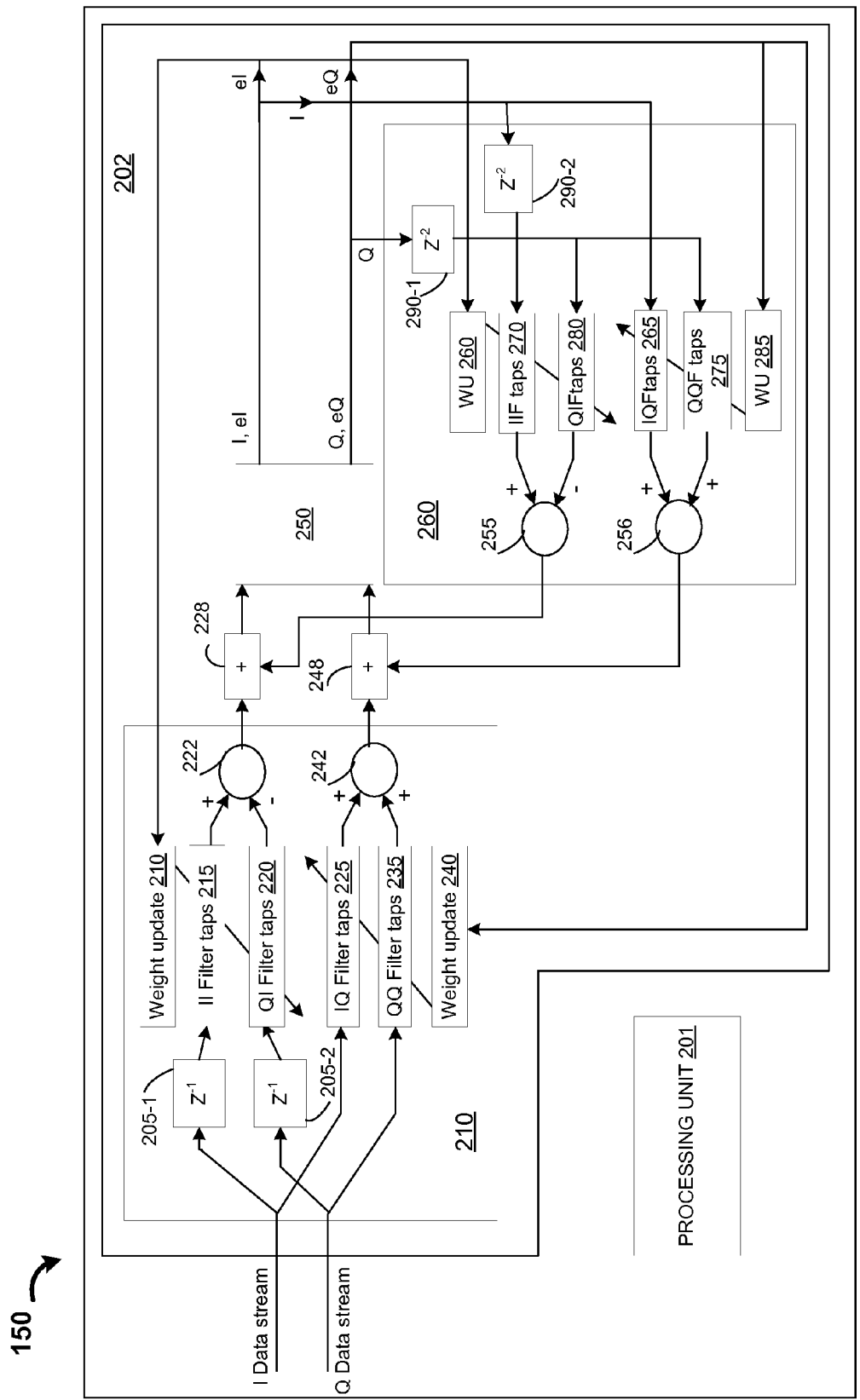
FIG. 2 illustrates an equalizer, which determines the coefficients or taps in the feedforward and feedback path to cancel the effect of platform noise and to increase the signal to interference ratio (SIR) according to one embodiment.

An embodiment of ATSC DTV equalizer 150, which may support techniques to reduce the effect of platform noise is illustrated in FIG. 2. In one embodiment, the equalizer 150 may represent a decision feedback equalizer (DFE). In one embodiment, the equalizer 150 may be based on a complex 64 staggered QAM (SQAM) equivalent of the 8-PAM VSB signal. In one embodiment, the equalizer 150 may comprise a processing unit 201 and an equalizing unit 202.

In one embodiment, the processing unit 201 may perform channel estimation, equalizer length and initialization, equalizer training, and such other tasks. In one embodiment, the processing unit 201 may use the main path signal power to scale the received data such that the amplitude or value of the principal tap may equal 1. In one embodiment, the equalizer 150 may extract the PN sequence from the data stream and use the PN sequence (PN 511, for example) present at the start of the data field sync to determine the main path signal power.

In one embodiment, the received PN sequence within the data field sync may be cross correlated with an ideal or standard PN sequence. In one embodiment, the processing unit 201 may cancel correlation noise and normalize and apply a threshold, which may be used for identifying the principal, pre-cursor, and the post-cursor. In one embodiment, the processing unit 201 may determine the principal path and the equalizer length based on the deviation of the pre-cursor and the post-cursor from the principal. In one embodiment, the processing unit 201 may initialize the equalizer 150 by causing the taps to be set based on the channel estimation.

In one embodiment, the equalizing unit 202 may comprise a feedforward filter (FFF) 210, a slicer 250, and a feedback filter (FBF) 260. In one embodiment, the FFE 210 may operate at 10.76 MHz and the FBF 260 may operate at 5.38 MHz.

In one embodiment, the feedforward filter (FFF) 210 may comprise delay elements 205-1 and 205-2, an inphase (I) section comprising a weight update block WU 210, a IQF taps block 215, and QIF taps block 220 and a quadrature section comprising a IQF taps block 225, a QQF taps block 235, and a weight update block WU 240. In one embodiment, the WU 210 may receive control signals from an in-phase error 'eI' output of the slicer 250 and update the IIF taps 215 and IQF taps 220. In one embodiment, the output of the IIF taps 215 and IQF taps 220 may be provided as inputs to a summer block 222 and the output of the summer 222 may be provided as an input to the adder 228. In one embodiment, the adder 228 may receive other input from the Inphase section of the feedback filter 260 and the output of the adder 228 may be provided as a first input to the slicer 250. In one embodiment, the WU 240 may receive control signals from a quadrature error 'eQ' output of the slicer 250 and update the IQF taps 225 and QQF taps 235. In one embodiment, the output of the IQF taps 225 and QQF taps 235 may be provided as inputs to a summer block 242 and the output of the summer 242 may be provided as an input to the adder 248. In one embodiment, the adder 248 may receive other input from the quadrature section of the feedback filter 260 and the output of the adder 248 may be provided as a second input to the slicer 250.

In one embodiment, the FFF 210 may process two samples such as $(I_0+jQ_0, I_1+jQ_1)$ at a time. In one embodiment, the processing of two symbols may be indicated by the delays 205-1 and 205-2 at the input. In one embodiment, for time instances n=0, 1, the DFE inphase and quadrature outputs may be estimates of $I_0$ and $I_1$, respectively. If $w_{fi}=wI_{fi}+jwQ_{fi}$, i=0, 1, ... $N_f$-1 are the FFF weights, the IIF taps 215 in the inphase path and the QQF taps 235 in the quadrature path may equal ($wI_{fi}$) and the QIF taps 220 in the inphase path and the IQF taps 225 in the quadrature section of the FFF 210 may equal ($wQ_{fi}$).

In one embodiment, the FBF 260 may comprise an inphase section and a quadrature section. In one embodiment, the WU 260 may receive control signals from the in-phase error 'eI' output of the slicer 250 and update the IIF taps 270 and IQF taps 280. In one embodiment, the output of the IIF taps 270 and IQF taps 280 may be provided as inputs to a summer block 255 and the output of the summer 255 may be provided as an input to the adder 228. In one embodiment, the WU 285 may receive control signals from the quadrature error 'eQ' output of the slicer 250 and update the IQF taps 265 and QQF taps 275. In one embodiment, the output of the IQF taps 265 and QQF taps 275 may be provided as inputs to the summer 256 and the output of the summer 256 may be provided as an input to the adder 248. In one embodiment, the slicer 250 may generate control signals in response to receive inputs from the adder 228 and 248.

In one embodiment, the FBF 260 may process each SQAM symbol such as $(I_0-jI_1)$ or $(-I_2+jI_3)$ at a time. If $w_{bi}=wI_{bi}+jwQ_{bi}$, i=1, ... $N_b$ are the FBF weights, the IIF taps 270 in the inphase section and QQF taps 275 in the quadrature section may equal ($wI_{bi}$) and the QIF taps 280 in the inphase section and the IQF taps 265 in the quadrature section of the FBF 260 may equal ($wQ_{bi}$). In one embodiment, the delays 290-1 and 290-2 ($z^{-2}$) (the power of 2 represents 5.38 MHz rate) may be provisioned to allow the FBF 260 to use only past symbols. For example, at SQAM instant n=3, the inphase FBF output may be based on the delayed FBF input $I_0$, $I_1$; and for the quadrature output either the delayed input $I_0$, $I_1$ or else $I_2$, $I_1$ may be used since $I_2$ is at an earlier sample instant n=2.

In one embodiment, the slicer 250 may estimate the transmitted symbols. In one embodiment, the slicer 250 may generate an in-phase (I) symbol and an in-phase error (eI) symbol and a quadrature (Q) symbol and a quadrature error (eQ) symbol. In one embodiment, the slicer 250 may provide the in-phase (I) symbol to IQF taps 265 and to IIF taps 270 through a delay element 290-2. IN one embodiment, the in-phase error (eI) component may be provided as an input to the weight update units 210 and 260. In one embodiment, the slicer 250 may provide the quadrature (Q) symbol to QQF taps 275 and QIF taps 280 through a delay element 290-1. In one embodiment, the quadrature error (eQ) component may be provided as an input to the weight update units 240 and 285.

Figure 3:
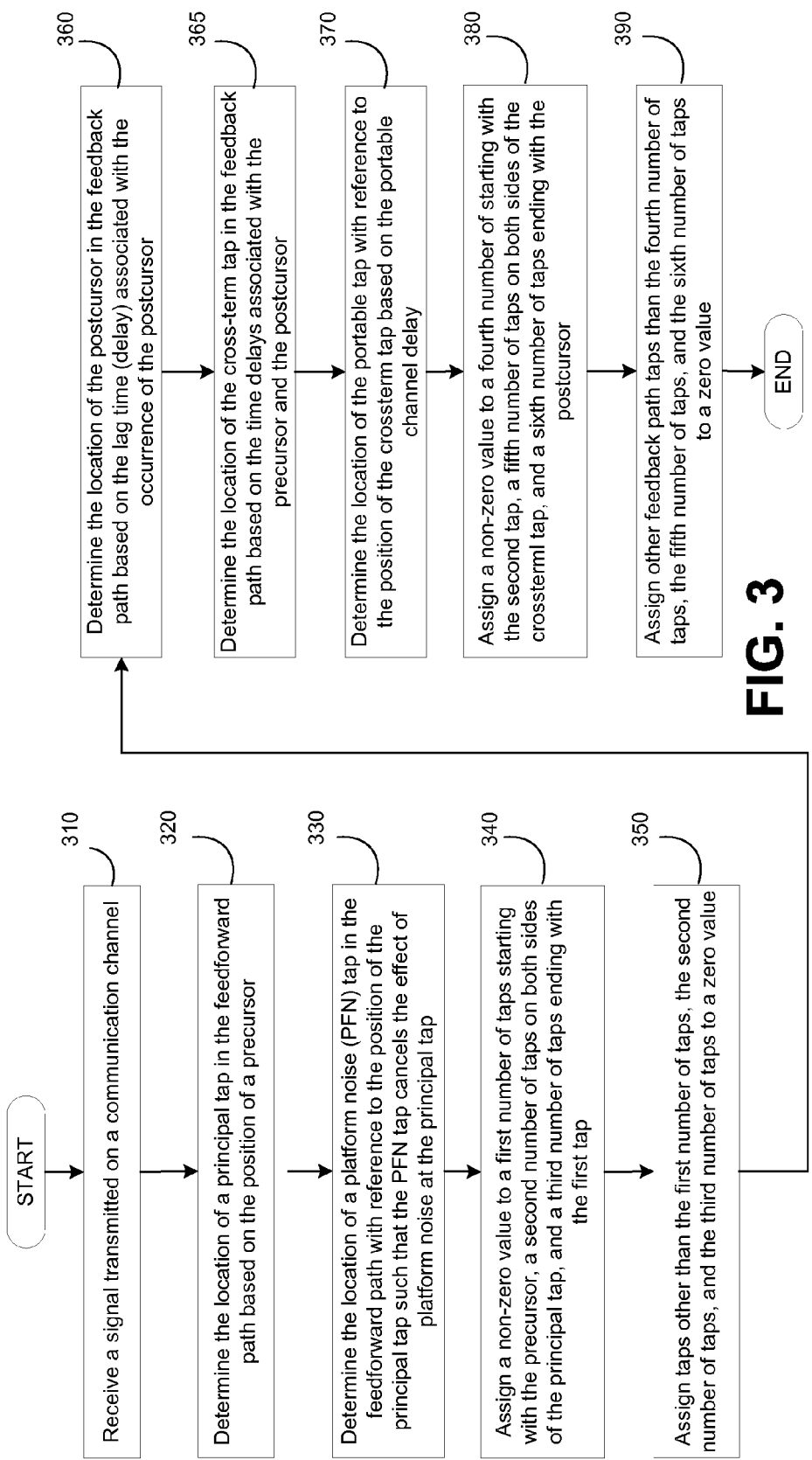
FIG. 3 is a flow-chart illustrating a technique for determining and selection of positions of the non-zero value taps in the feedforward and feedback path to cancel the effect of platform noise and to enhance the SIR according to one embodiment.

An embodiment of an operation of the equalizer 150 to cancel the platform noise in a static, portable environment in the presence of additive white Guassian noise (AWGN) is illustrated in FIG. 3. As an example, the equalizer 150 may designed for a complex environment such as: 25 dB SNR, PFN of 32 kHz modulation frequency for 1 MHz spread centered at 0, static multipaths of [−25 47] µsec, [−10 −10] dB, a birth-death multipath (portable channel model) of 200 nsec delay, ramp up from −20 dB to −3 dB in 0.1 sec, steady for 0.1 sec and then ramp down in 0.1 sec, 20 Hz Doppler.

For a low power equalizer design, considering the requirements for portable, static and PFN, the equalizer 150 design may comprise of 607 taps in the feedforward path, 253 taps in the feedback path with a principal tap at location 270 in the feedforward path, 5 taps on each side of the principal tap and both ends (pre-cursor to the left of the principal tap and PFN tap to the right of the principal tap) feedforward path are non zero, 3 taps at feedback ends and cross-term location (taps 115-122) are non-zero.

In one embodiment, the flow-chart 300 is described with reference to the above example and the flow-chart 300 describes the technique for determining the location of the taps in the feedforward and feedback path.

In block 310, the receiver 100 may receive a signal transmitted on the communication channel 105. In one embodiment, the signal transmitted may be 8-PAM VSB format. In one embodiment, the signal in 8-PAM format may be converted into analytic signal comprising I and Q components.

In block 320, the receiver 100 may determine the location of a principal tap in the feedforward path based on position of the precursor. In one embodiment, the processing unit 201 may determine the position of the principal tap based on the delay value $\lambda_p$=25 µsec. In one embodiment, the principal tap occurs 25 µsec after the occurrence of the precursor. In one embodiment, the processing unit 201 may determine the location of the principal tap.

In one embodiment, the sampling rate in the feedforward path may equal 10.76 MHz and the sampling rate in the feedback path may equal 5.38 MHz. In one embodiment, the symbol 'T' sec (=1/5.38e6) may be used to represent the sampling time period in the feedback path and a symbol T/2 (=1/10.76e6=92.9e−9) second may be used to represent the sampling time period in the feedforward path. In one embodiment, the position of the principal tap may be determined by the equation (4) below.

$$\text{Location of principal tap} = (\lambda_\beta/(T/2)) = 25e{-}6/92.9e{-}9 = 269 \quad \text{Equation (4)}$$

In one embodiment, in the feedforward path, the position of the taps starts from 1 to N, wherein N is a positive integer number. In one embodiment, the location or position of the pre-cursor may be at '1' and the principal tap may occur at a tap position of 270 (location of the principal tap+position of the pre-cursor=269+1=270). In one embodiment, the location of pre-cursor and the location of the principal tap is, respectively, shown by a marker 410 and a marker 430 of FIG. 4.

In one embodiment, the processing unit 201 may determine the postion of the platform noise (PFN) tap in the feedforward path based on the position of the principal tap such that the PFN tap cancels the effect of platform noise at the principal tap. In one embodiment, the electromagnetic interference due to high clock frequencies in computer systems and peripherals may be reduced by broadening the clock signals using spread spectrum clock generation techniques. In one embodiment, the interference caused by harmonics of multiple spread clocks with base frequencies such as 40-80 MHz (LCD pixel clock), 33.33 MHz (PCI clock), 100 MHz (PCIe clock), as well as data buses, video signals, which may be referred to as platform noise (PFN) is a concern in portable environment, i.e. notebooks and netbooks, especially at low SNRs. In one embodiment, a majority of the computer spread clocks may use a modulation frequency of about 32 kHz and the spread (FM signal bandwidth) may vary from 1 to 3 MHz. In one embodiment, the associated signal baseband model based on 1M generation may be given by Equation (5) below.

$$p(nT) = \exp(j2\pi(f_{sc}nT + (B_{fm}/2f_m)\sin(2\pi f_m nT))) \quad \text{Equation (5)}$$

wherein 'fsc' is the spread center frequency (fsc=0.25 fs if midway and fs=1/T=10.76 MHz is the ATSC symbol rate), fm is the modulation frequency (30-60 kHz) and Bfm is the spread (1-3 MHz).

For fsc=0, p(nT−(1/fm)T)=p(nT) may imply that the a feedforward tap at (1/fm) T may cancel the effect of PFN at the principal. While fsc=0, p(nT) may represent a periodic signal such that the effect of PFN at the principal may be same as the effect of PFN at 1/fm time earlier or later than the principal. In one embodiment, the effect of PFN at the principal may be viewed as a delayed copy of the effect of PFN at 1/fm time earlier than the principal. In one embodiment, the received signal at the principal may comprise PFN and a desired signal. In one embodiment, to cancel the PFN at the principal such that the desired signal may be retained, the received signal may be allowed to pass through the feedforward path of the equalizer 150 with a PFN tap set at (1/fm) time away from the principal but with a opposite sign. In one embodiment, the PFN tap may be set at (1/fm) time point away from the principal tap such that the PFN tap may be located after the principal tap in the feedforward path. However, the pre-cursor 410 may be positioned before the principal tap 430. In one embodiment, if the pre-cursor 410 is to the left of the principal, the PFN tap may be set on the right side of the principal and a distance from the principal that may be determined as shown below.

Substituting fsc=0 in the Equation (5) yields Equation (6) below $$p(nT) = \exp(j*2*pi*(Bfm/2fm)*\sin(2*pi*fm*nT)) \quad \text{Equation (6).}$$

In one embodiment, another new tap index k may be introduced such that kT=1/fm, Equation (7) given below is derived from substituting kT for 1/fm in Equation (6) above.

$$\begin{aligned}\sin(2*pi*fm*(nT-1/fm)) &= \sin(2*pi*fm*(nT-kT)) = \sin(2*pi*fm*nT-2*pi*fm*kT) = \sin(2*pi*fm*nT-2*pi*fm*1/fm) = \sin(2*pi*fm*nT-2*pi) = \sin(2*pi*fm*nT)\end{aligned} \quad \text{Equation (7)}$$

Therefore, for fc~0, p(nT−1/fm)=p(nT). In one embodiment, from the above equations (5) to (7), it may be concluded that the feedforward tap at (1/fm) may cancel the PFN effect at the principal. In ATSC system, the baseband sampling rate may equal 10.76 MHz (oversample by 2) and the value of T/2 may thus equal 92.9e−9 seconds ((1/10.76e6).

Figure 4:
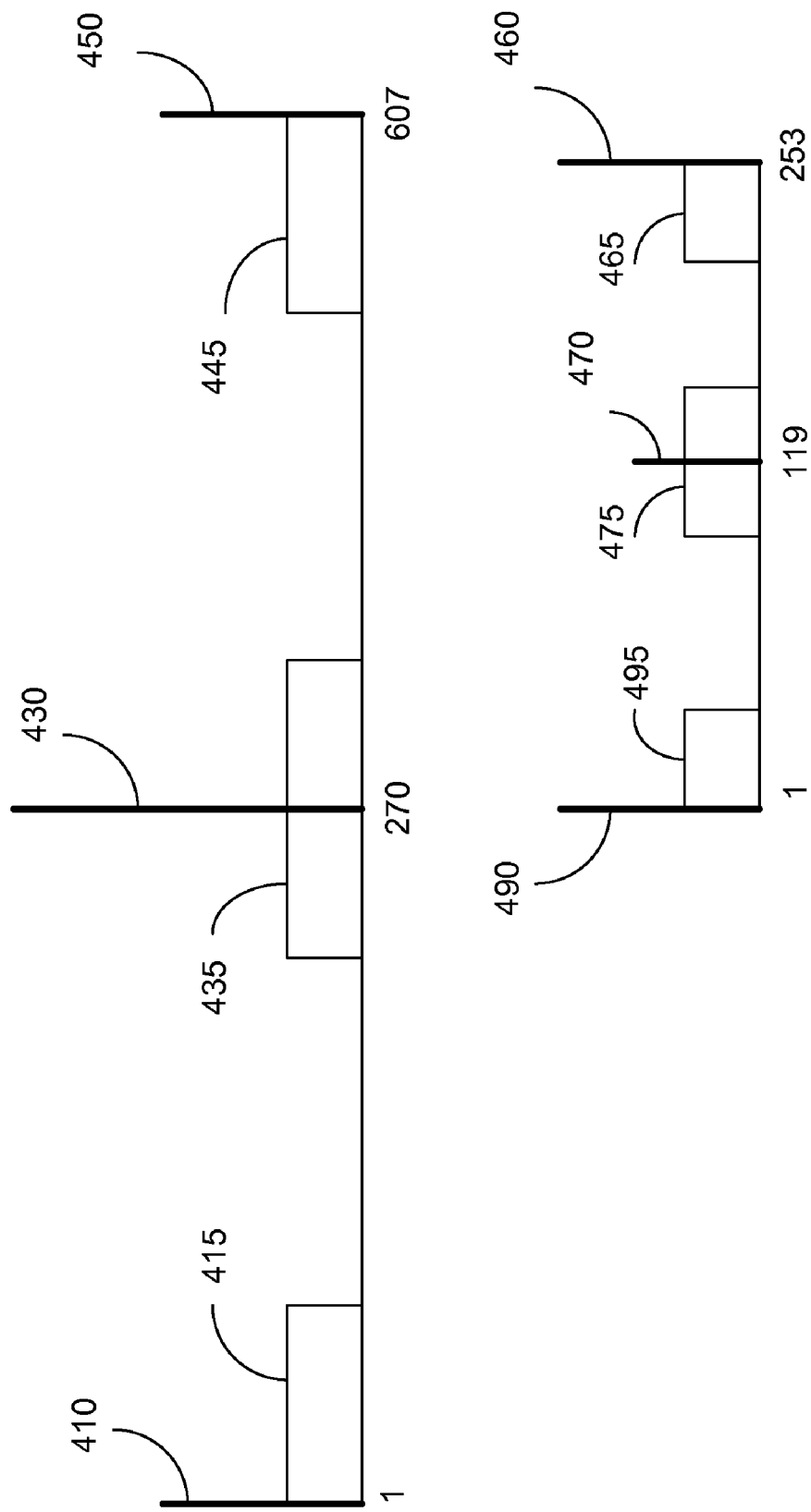
FIG. 4 illustrates a line diagram 400, which depicts the position of various taps in the feedforward and feedback path to cancel effect of platform noise and static multipath and portable channel and to enhance the SIR according to one embodiment.

As mentioned above kT=1/fm, so k=(1/fm)/T=(1/32e3)/92.9e−9=336.3, which is between 336 and 337. In one embodiment, the PFN tap 450 as shown in FIG. 4 may be set at 337 positions away from the principal tap and on the right side of the principal tap 430. In one embodiment, the location of the PFN tap may equal 607 (=location of the principal tap+value of k=270+337=607). In one embodiment, setting a PFN tap at location 607 may allow the equalizer 150 to effectively reduce the effect of the pre-cursor 410 and the effect of PFN on the principal.

In block 340, the processing unit 201 may assign a first number (L) of taps starting from the precursor 410, a second number (M) of taps around the principal tap 430, and a third number of taps (S) ending at the PFN tap 450 to a non-zero real or complex value. In one embodiment, the first number (L) and the third number (S) may equal 5 and the taps 2, 3, 4, 5, and 6 starting from the precursor tap 410 at location 1 and the taps 602, 603, 604, 605, and 606 that end with a PFN tap 450 at location 607 may be set to a non-zero real or complex value. In one embodiment, the taps 267, 268, 269 and 271, 272, and 273 (second number of taps S) with principal tap 430 at the centre location 270 may be set to non-zero real or complex value.

In block 350, the processing unit 201 may set the remaining taps or the taps other than the first, second, and the third taps to a zero value. In one embodiment, setting the remaining taps to a zero value may substantially decrease the total number of non-zero taps (=L+M+S) and the adaptation constant μ is inversely proportional to the total number of non-zero taps. As a result, if the total number of non-zero taps is less, the equalizer 150 may converge quickly and may track the mobile channel effectively.

In block 360, the processing unit 201 may determine the location of the post-cursor in the feedback path based on the lag or delay time of the post-cursor. In one embodiment, the sampling rate in the feedback path may equal 5.38 MHz. In one embodiment, the value of 'T' may equal (=1/5.38e6) and may be used to represent the sampling time period in the feedback path. In one embodiment, the position of the post-cursor tap may be determined by the equation (8) below.

$$\text{Location of post-cursor tap} = (\lambda\alpha/T) = 47e{-}6*5.38e{-}9 = 252.9 \quad \text{Equation (8)}$$

In one embodiment, the location of the post-cursor tap 460 may be at 253 as depicted in the FIG. 4.

In block 365, the processing unit 201 may determine the location of cross-term tap in the feedback path using the delay values ($\lambda_\beta$, $\lambda\alpha$) associated with the pre-cursor 410 and the post cursor 460. In one embodiment, the cross-term may equal ($2\alpha$ $\beta z^{\lambda_\beta - \lambda_\alpha}$). In one embodiment, $\lambda_\beta$=25 μseconds and $\lambda_\alpha$=47 μseconds and $\lambda_\beta - \lambda_\alpha$=(25−47)=−22 μseconds and the cross-term location may equal 237 T/2 spacing or 118.5 T spacing. As the sampling rate in the feedback path may equal T (=1/5.38e6), the cross-term tap 470 may be located at a location 119.

In block 370, the processing unit 201 may determine the location of the portable tap with reference to the position of the cross-term tap 470 and based on the portable channel delay. In one embodiment, the portable channel delay or a multipath delay may equal 200 nanoseconds. In one embodiment, the processing unit 201 may determine the location of the portable tap as given in Equation (9) below.

$$\text{Location of portable tap} = \text{portable channel delay} * T/2 = 200e{-}09 * 5.38e6 = 1 \quad \text{Equation (9)}$$

Thus, the portable tap 490 may be set at location of 1 shifted from the principal tap 430. In one embodiment, the portable tap may decrease the effect of components in the received copies of the signal transmitted on the portable channel 105. In one embodiment, the components of the received copies may be caused by a time-varying characteristic of a birth-death type channel 105. In one embodiment, the tap value may increase or decrease with adaptively based on the strength of the received copies.

In block 380, the processing unit 201 may assign a fifth number (A) of taps 495 starting from the portable tap 490, a sixth number (B) of taps 475 around the cross-term tap 470, and a seventh number (C) of taps 465 ending at the post-cursor tap 460 to a non-zero positive real or complex value. In one embodiment, the taps 495 may comprise taps 2, 3, and 4 on the feedback path. In one embodiment, the taps 475 may comprise 116, 117, 118, and 120, 121, and 122 with the cross-term tap 470 at the centre location. In one embodiment, the taps 465 may comprise 250, 251, and 252.

In block 390, the processing unit 201 may set the remaining taps or the taps other than the fifth, sixth, and the seventh taps to a zero value. In one embodiment, setting the remaining taps to a zero value may substantially decrease the total number of non-zero taps (=A+B+C)) and the adaptation constant (ADP) may be inversely proportional to the total number of non-zero taps. As a result, if the total number of non-zero taps is less, the equalizer 150 may converge quickly and may track the mobile channel effectively.

Figure 5:
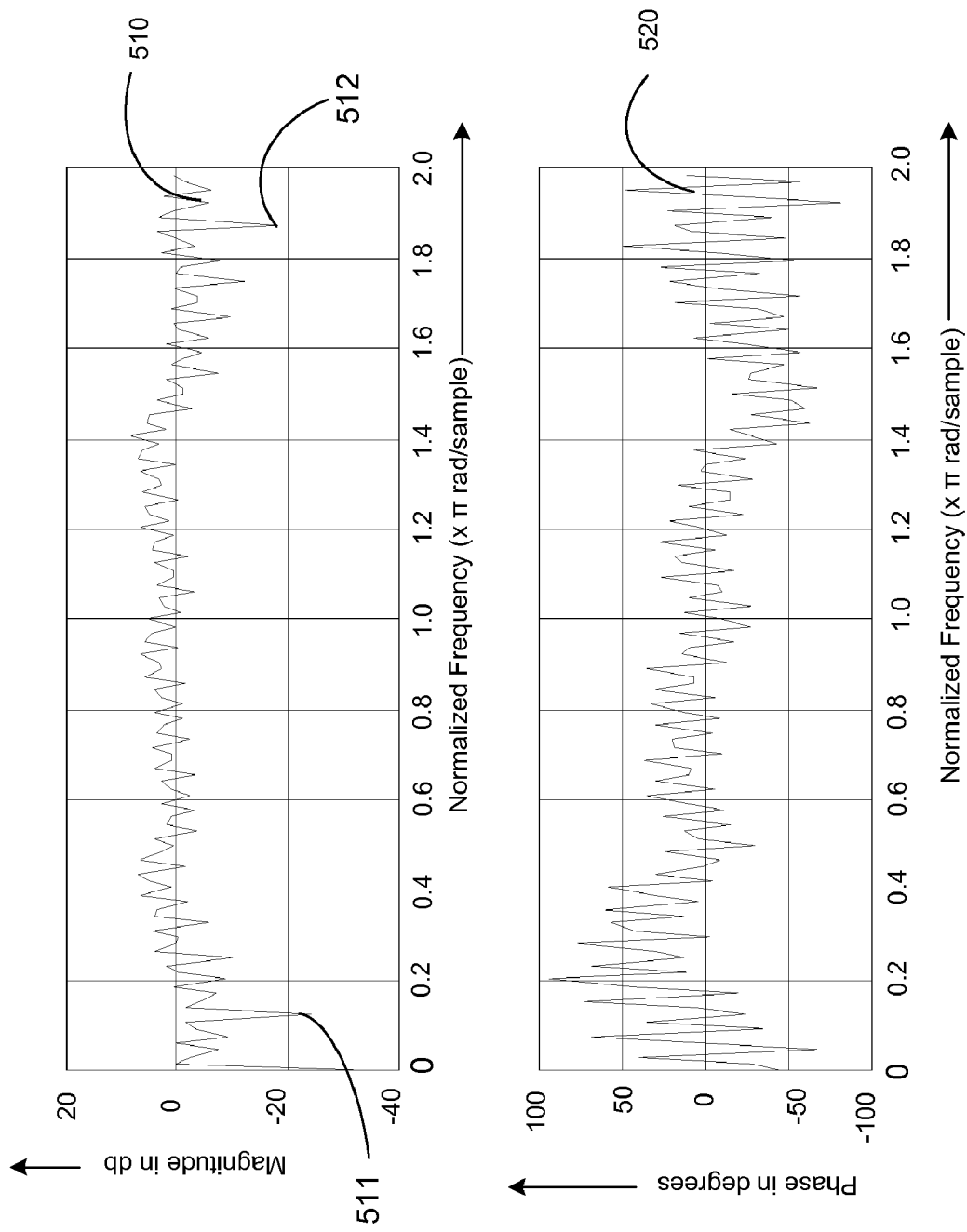
FIG. 5 illustrates a graph 500 of magnitude and phase plotted with reference to a change in the normalized frequency for the equalizer according to one embodiment.

A graph depicting a frequency response of the equalizer 150 while using a modulating signal of frequency (fm) of 32 kHz is illustrated in FIG. 5. In one embodiment, the plot 510 depicts variation of magnitude vs. normalized frequency. In one embodiment, the plot 520 depicts variation of phase vs. normalized frequency. In one embodiment, the plot 510 and 520 depict an improved response that affects the desired signal to a less extent and the periodic platform noise frequency spikes to a large extent. In one embodiment, the frequency response of plot 510 depicts one or more notches at the interference or the platform noise and the width of the notches may depend on the spread of the platform noise. In one embodiment, the plot 520 depicts notches 511 and 512, respectively, at a normalized frequency of 0.14 (approx) and 1.88 (approx) units. In one embodiment, the normalized frequency of 1.0 may imply 5.38 Mhz and a notch at 0.14 and 1.88 units may imply that the equalizer 150 may disallow the platform noise or interference, respectively, at 0.753 Mhz (=0.14×5.38 Mhz) and 10.11 Mhz (=1.88×5.38 Mhz) to pass through.

Figure 6:
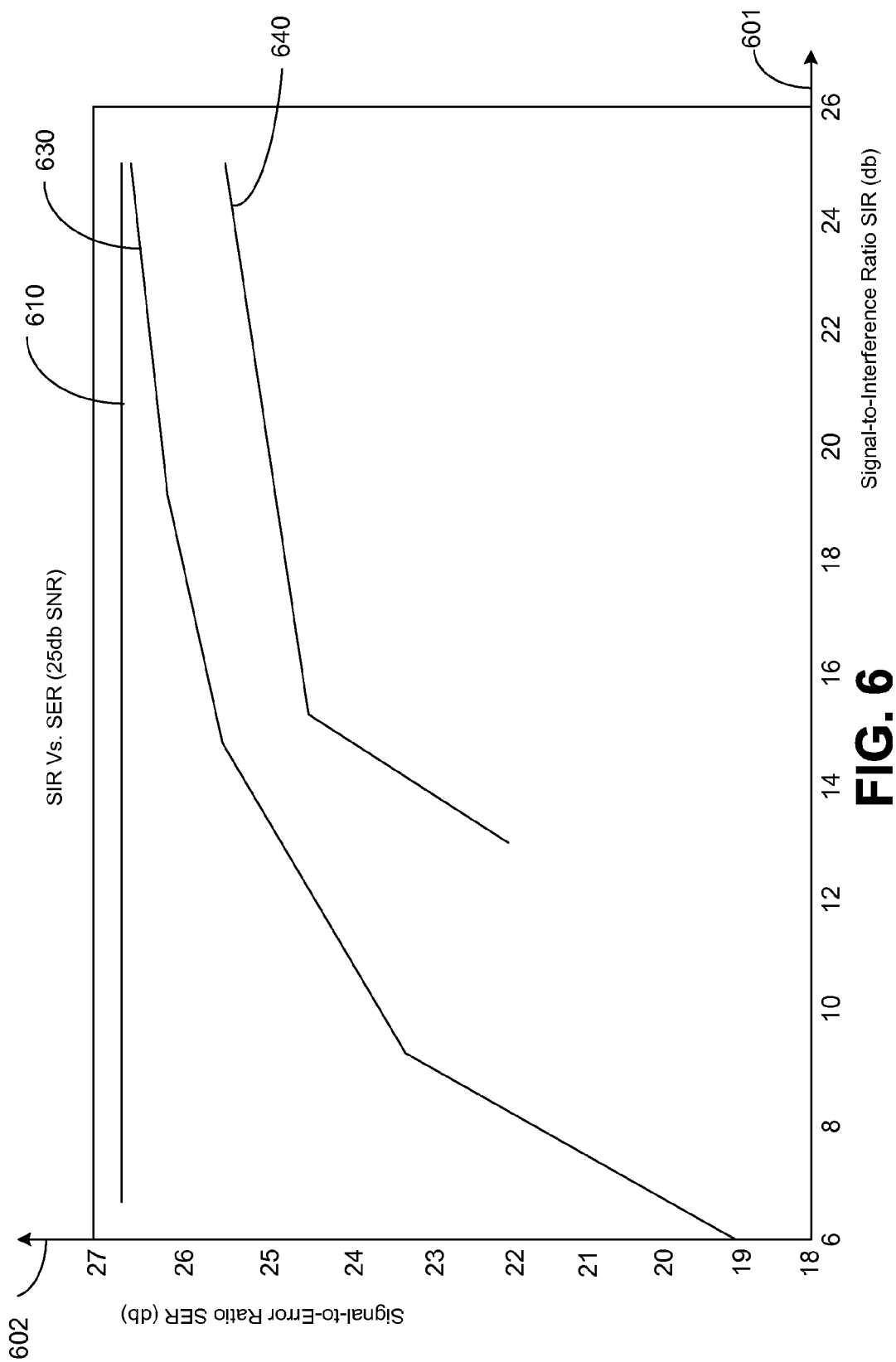
FIG. 6 is a graph 600, which depicts a substantial improvement in the performance of an equalizer according to one embodiment.

A graph depicting a plot of signal-to-interference ratio (SIR) vs. signal to error ratio (SER) of the equalizer 150 is illustrated in FIG. 6. In one embodiment, the SIR is plotted on x-axis 601 and the SER (or ESR) is plotted on the y-axis 602. In one embodiment, the plot 610 represents a graph of an ideal equalizer in which the SER remains almost constant at about 27 db with the variation of SIR from 6 to 26 db. A plot 630 depicts a graph for a sparse equalizer 150 in which 337 taps (or the PFN tap 450 at 607) may be provided in the feedforward path counted from the principal tap 430 that may improve the threshold of visibility (TOV) under platform noise. In one embodiment, the TOV for the plot 630 may be at 6 db compared to a TOV of 13 db of a plot 640 of a conventional equalizer. Also, the plot 630 depicts that the signal to error ratio (SER) may be uniformly higher in the presence of a spread clock compared to the SER of the plot 640 of the conventional equalizer. In one embodiment, the plot 630 depicts that the SER may be about 1.5 to 2 db uniformly higher than that of the plot 640 of the conventional equalizer. In one embodiment, an appropriate scaling of the received signal with a decision directed gain control may cause a substantial improvement in the TOV SIR, which may decrease from 6 dB to −15 dB providing a gain of 20 dB (approximately) gain in SIR.

Figure 7:
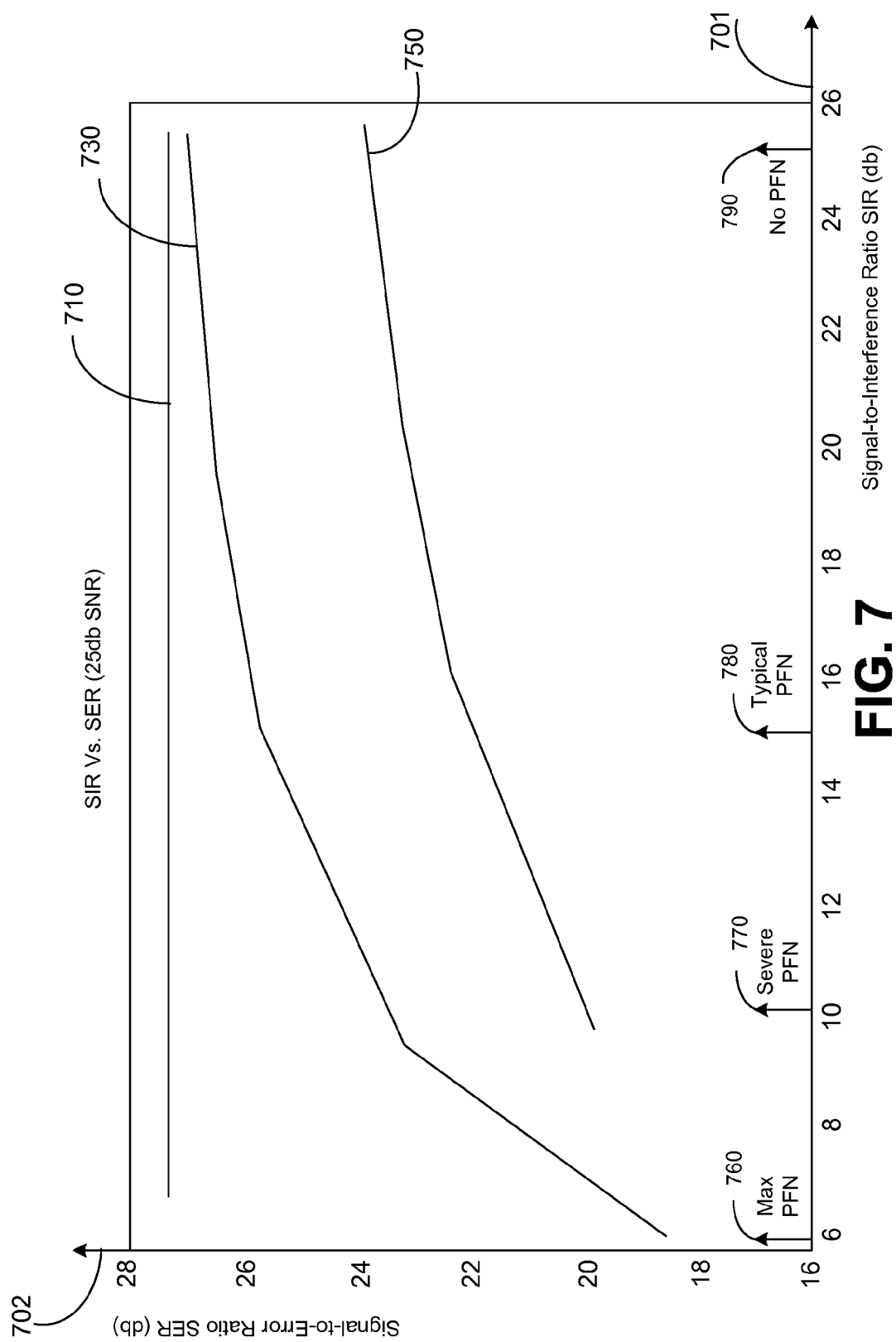
FIG. 7 is a graph 700, which depicts a substantial improvement in the performance of an equalizer under severe platform noise conditions and with a static and portable channel according to one embodiment.

A graph depicting a plot of signal-to-interference ratio (SIR) vs. signal to error ratio (SER) of the equalizer 150 with an addition of statics and portable environment to the PFN+ AGWN channel 105 is illustrated in FIG. 7. In one embodiment, the SIR is plotted on x-axis 701 and the SER (or ESR) is plotted on the y-axis 702. In one embodiment, the plot 710 represents a graph of an ideal equalizer in which the SER remains almost constant at about 27 db units with the variation of SIR from 6 to 26 db units. As described above, the plot 730 depicts an improvement in the threshold of visibility (TOV) from 13 db to 6 db and uniformly higher SER. In one embodiment, a conventional equalizer may not even converge under 25 db SIR while both static multipath and portable channel are present. In one embodiment, the plot 750 depicts a graph of a sparse equalizer 150 operating in statics and portable environment in addition to PFN and AGWN. In one embodiment, the plot 750 depicts that the equalizer 150 may perform equalization operation even under severe PFN conditions compared to conventional equalizers, which may not provide efficient equalization operation beyond typical PFN conditions.

Figure 8:
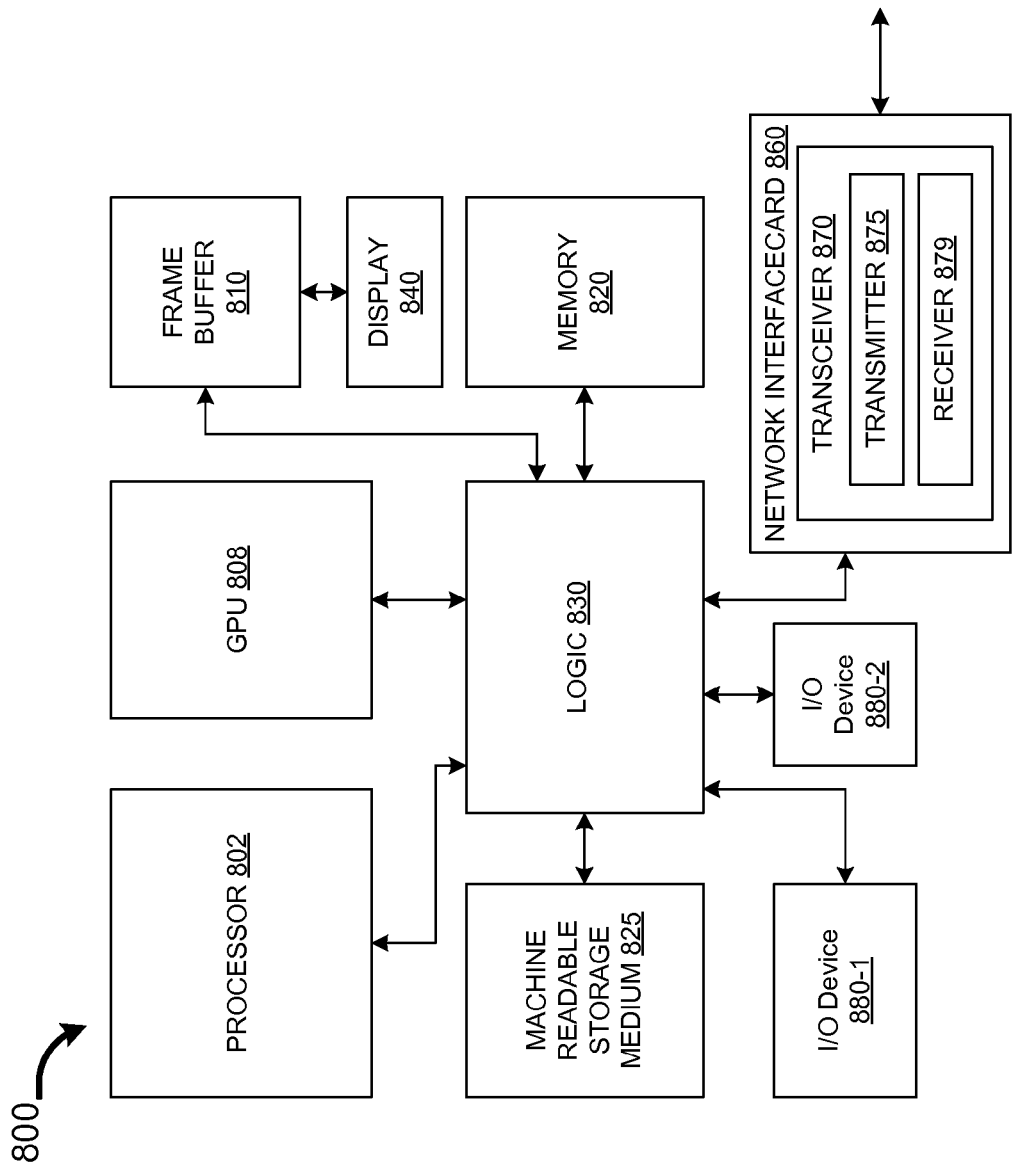
FIG. 8 illustrates a computer system 800, which supports ATSC DTV receiver according to one embodiment.

Referring to FIG. 8, a computer system 800 may include a general purpose processor 802 including a single instruction multiple data (SIMD) processor and a graphics processor unit (GPU) 805. The processor 802, in one embodiment, may perform enhancement operations in addition to performing various other tasks or store a sequence of instructions, to provide enhancement operations in machine readable storage medium 825. However, the sequence of instructions may also be stored in the memory 820 or in any other suitable storage medium.

While a separate graphics processor unit 805 is depicted in FIG. 8, in some embodiments, the processor 802 may be used to perform enhancement operations, as another example. The processor 802 that operates the computer system 800 may be one or more processor cores coupled to logic 830. The logic 830 may be coupled to one or more I/O devices 880, which may provide interface the computer system 800. The logic 830, for example, could be chipset logic in one embodiment. The logic 830 is coupled to the memory 820, which can be any kind of storage, including optical, magnetic, or semiconductor storage. The graphics processor unit 805 is coupled through a frame buffer 810 to a display 840.

In one embodiment, the computer system 800 may comprise network interface card (NIC) 860. In one embodiment, the NIC 860 may support a transceiver 870, which may comprise a transmitter 875 and a receiver 879. In one embodiment, the receiver 879 may be similar to the receiver 100 discussed above. In one embodiment, the receiver 879 may comprise a sparse equalizer such as the equalizer 150. In one embodiment, the receiver 879 may provide reliable equalization operation in a statics and portable environment in addition to presence of PFN and AGWN.

In one embodiment, the receiver 879 may support techniques to determine the location of a PFN tap such as the PFN tap 430 and a portable tap such as the portable tap 490, which may enable the equalizer to operate under severe PFN conditions. Also, as only a small number of taps are of non-zero value, the convergence of such an equalizer may be quick and the complexity and power consumption of the receiver 879 employing such an equalizer may be low. In one embodiment, the equalizer of the receiver 879 may also provide for substantial improvement in TOV SIR.

The equalization techniques described herein may be implemented in various hardware architectures supported by graphics processor 805 or a general purpose processor 802 or a customized communication chips provisioned within the network interface card 860. In one embodiment, the equalization techniques described herein may be implemented in software as a set of software instructions stored in the machine readable storage medium 825. The equalization techniques described herein may be used in various systems such as the mobile phone, personal digital assistants, mobile internet devices, and such other systems.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method to perform equalization in a receiver comprising:
   receiving a signal transmitted on a communication channel
   determining a location of a principal tap, a location a platform noise tap, and a pre-cursor tap in a feedforward path of an equalizer,
   determining a location of a post-cursor tap, a location of a cross-term tap, and a location of a portable tap in a feedback path of the equalizer, and
   aligning the portable tap in the feedback path with the principal tap in the feedforward path,
   wherein the position of the platform noise tap and the position of the portable tap is to cancel the effect of platform noise and the effect of portable channel on a principal located at the principal tap.

2. The method of claim 1, wherein the platform noise tap is located after the principal tap in the feedforward path of the equalizer.

3. The method of claim 2, wherein the platform noise tap is located at a time point after the principal tap in the feedforward path, wherein the time point is determined based on a frequency of a modulation signal used to generate spread spectrum clocks.

4. The method of claim 1 further comprises
   identifying a first set of taps having the pre-cursor tap as a start tap, a second set of taps having the platform noise tap as an end tap, and a third set of taps having the principal tap at the center in the feedforward path,
   setting the first set of taps, the second set of taps, and the third set of taps to a non-zero value without affecting the pre-cursor tap, the principal tap, and the platform noise tap, and
   setting taps other than the first set of taps, the second set of taps, and the third set of taps to a zero value.

5. The method of claim 1, wherein the portable tap is located at a location that occurs before the location of the cross-term tap and the post-cursor tap in the feedback path of the equalizer.

6. The method of claim 5, wherein the portable tap is located at a time point before the cross-term tap, wherein the time point is determined based on multipath delay caused by the communication channel.

7. The method of claim 6, wherein the portable tap is located at a location that is substantially close to the location of the principal tap.

8. The method of claim 4 further comprises
   identifying a fourth set of taps having the post-cursor tap as an end tap, a fifth set of taps having the portable as a start tap, and a sixth set of taps having the cross-term tap at the center in the feedback path,
   setting the fourth set of taps, the fifth set of taps, and the sixth set of taps to a non-zero value without affecting the post-cursor tap, the cross-term tap, and the portable tap, and
   setting taps other than the fourth set of taps, the fifth set of taps, and the sixth set of taps to a zero value.

9. The method of claim 8, wherein the total of the first set of taps, the second set of taps, the third set of taps, the fourth set of taps, the fifth set of taps, and the sixth set of taps is substantially less compared to the taps other than the first set of taps, the second set of taps, the third set of taps, the fourth set of taps, the fifth set of taps, and the sixth set of taps, wherein an adaption constant that is inverse to a total number of non-zero taps causes faster convergence of the equalizer.

10. A machine-readable storage medium to perform equalization in a receiver comprising a plurality of instructions that in response to being executed result in a processor comprising:
    receiving a signal transmitted on a communication channel
    determining a location of a principal tap, a location a platform noise tap, and a pre-cursor tap in a feedforward path of an equalizer,
    determining a location of a post-cursor tap, a location of a cross-term tap, and a location of a portable tap in a feedback path of the equalizer, and
    aligning the portable tap in the feedback path with the principal tap in the feedforward path,
    wherein the position of the platform noise tap is to cancel the effect of platform noise on a principal located at the principal tap.

11. The machine-readable storage medium of claim 10, wherein the platform noise tap is located after the principal tap in the feedforward path of the equalizer.

12. The machine-readable storage medium of claim 11, wherein the platform noise tap is located at a time point after the principal tap in the feedforward path, wherein the time point is determined based on a frequency of a modulation signal used to generate spread spectrum clocks.

13. The machine-readable storage medium of claim 10 further comprises
    identifying a first set of taps having the pre-cursor tap as a start tap, a second set of taps having the platform noise tap as an end tap, and a third set of taps having the principal tap at the center in the feedforward path,
    setting the first set of taps, the second set of taps, and the third set of taps to a non-zero value without affecting the pre-cursor tap, the principal tap, and the platform noise tap, and
    setting taps other than the first set of taps, the second set of taps, and the third set of taps to a zero value.

14. The machine-readable storage medium of claim 10, wherein the portable tap is located at a location that occurs before the location of the cross-term tap and the post-cursor tap in the feedback path of the equalizer.

15. The machine-readable storage medium of claim 14, wherein the portable tap is located at a time point before the cross-term tap, wherein the time point is determined based on multipath delay caused by the communication channel.

16. The machine-readable storage medium of claim 15, wherein the portable tap is located at a location that is substantially close to the location of the principal tap.

17. The machine-readable storage medium of claim 13 further comprises
identifying a fourth set of taps having the post-cursor tap as an end tap, a fifth set of taps having the portable as a start tap, and a sixth set of taps having the cross-term tap at the center in the feedback path,
setting the fourth set of taps, the fifth set of taps, and the sixth set of taps to a non-zero value without affecting the post-cursor tap, the cross-term tap, and the portable tap, and
setting taps other than the fourth set of taps, the fifth set of taps, and the sixth set of taps to a zero value.

18. The machine-readable storage medium of claim 17, wherein the total of the first set of taps, the second set of taps, the third set of taps, the fourth set of taps, the fifth set of taps, and the sixth set of taps is substantially less compared to the taps other than the first set of taps, the second set of taps, the third set of taps, the fourth set of taps, the fifth set of taps, and the sixth set of taps, wherein an adaption constant that is inverse to a total number of non-zero taps causes faster convergence of the equalizer.

19. A receiver to perform equalization comprising:
a radio frequency tuner coupled to a communication channel, wherein the radio frequency tuner is to receive a signal transmitted on the communication channel,
a synchronous detector coupled to the radio frequency tuner, wherein the synchronous detector is to convert the pulse amplitude modulated signal into a quadrature amplitude modulated signal,
an equalizer coupled to the synchronous detector, wherein the equalizer further comprises a processing unit and an equalization unit,
wherein the processing unit is to determine a location of a principal tap, a location a platform noise tap, and a pre-cursor tap in a feedforward path of an equalizer, determine a location of a post-cursor tap, a location of a cross-term tap, and a location of a portable tap in a feedback path of the equalizer, and align the portable tap in the feedback path with the principal tap in the feedforward path,
wherein the position of the platform noise tap is to cancel the effect of platform noise on a principal located at the principal tap.

20. The receiver of claim 19, wherein the platform noise tap is located after the principal tap in the feedforward path of the equalizer, wherein the time point is determined based on a frequency of a modulation signal used to generate spread spectrum clocks.

21. The receiver of claim 20, wherein the processing unit is to,
identify a first set of taps having the pre-cursor tap as a start tap, a second set of taps having the platform noise tap as an end tap, and a third set of taps having the principal tap at the center in the feedforward path,
set the first set of taps, the second set of taps, and the third set of taps to a non-zero value without affecting the pre-cursor tap, the principal tap, and the platform noise tap, and
set taps other than the first set of taps, the second set of taps, and the third set of taps to a zero value.

22. The receiver of claim 21, wherein the portable tap is located at a location that occurs before the location of the cross-term tap and the post-cursor tap in the feedback path of the equalizer, wherein the portable tap is located at a time point before the cross-term tap, wherein the time point is determined based on multipath delay caused by the communication channel.

23. The receiver of claim 22, wherein the portable tap is located at a location that is substantially close to the location of the principal tap.

24. The receiver of claim 23, wherein the processing unit is to,
identify a fourth set of taps having the post-cursor tap as an end tap, a fifth set of taps having the portable as a start tap, and a sixth set of taps having the cross-term tap at the center in the feedback path,
set the fourth set of taps, the fifth set of taps, and the sixth set of taps to a non-zero value without affecting the post-cursor tap, the cross-term tap, and the portable tap, and
set taps other than the fourth set of taps, the fifth set of taps, and the sixth set of taps to a zero value.

25. The receiver of claim 24, wherein the total of the first set of taps, the second set of taps, the third set of taps, the fourth set of taps, the fifth set of taps, and the sixth set of taps is substantially less compared to the taps other than the first set of taps, the second set of taps, the third set of taps, the fourth set of taps, the fifth set of taps, and the sixth set of taps, wherein an adaption constant that is inverse to a total number of non-zero taps causes faster convergence of the equalizer.

26. A system comprising:
a platform comprising one or more processors, a memory, a display device, and buses, and
a network interface card coupled to the platform, wherein the network interface card further comprises a transmitter and a receiver, wherein the receiver is to,
receive a signal transmitted on a communication channel,
convert the pulse amplitude modulated signal into a quadrature amplitude modulated signal,
determine a location of a principal tap, a location a platform noise tap, and a pre-cursor tap in a feedforward path of an equalizer,
determine a location of a post-cursor tap, a location of a cross-term tap, and a location of a portable tap in a feedback path of the equalizer, and
align the portable tap in the feedback path with the principal tap in the feedforward path,
wherein the position of the platform noise tap is to cancel the effect of platform noise on a principal located at the principal tap.

27. The system of claim 26, wherein the platform noise tap is located after the principal tap in the feedforward path of the equalizer, wherein the platform noise tap is located at a time point after the principal tap in the feedforward path, wherein the time point is determined based on a frequency of a modulation signal used to generate spread spectrum clocks.

28. The system of claim 26, wherein the receiver is to,
identify a first set of taps having the pre-cursor tap as a start tap, a second set of taps having the platform noise tap as an end tap, and a third set of taps having the principal tap at the center in the feedforward path, set the first set of taps, the second set of taps, and the third set of taps to a non-zero value without affecting the pre-cursor tap, the principal tap, and the platform noise tap, and set taps other than the first set of taps, the second set of taps, and the third set of taps to a zero value.

29. The system of claim 28, wherein the portable tap is located at a location that occurs before the location of the cross-term tap and the post-cursor tap in the feedback path of the equalizer, wherein the portable tap is located at a time point before the cross-term tap, wherein the time point is determined based on multipath delay caused by the communication channel.

30. The system of claim 29, wherein receiver is to, identify a fourth set of taps having the post-cursor tap as an end tap, a fifth set of taps having the portable as a start tap, and a sixth set of taps having the cross-term tap at the center in the feedback path, set the fourth set of taps, the fifth set of taps, and the sixth set of taps to a non-zero value without affecting the post-cursor tap, the cross-term tap, and the portable tap, and set taps other than the fourth set of taps, the fifth set of taps, and the sixth set of taps to a zero value.

* * * * *